6444X
M. D. Mulford,
Washing Machine,
Patented Apr. 5, 1831
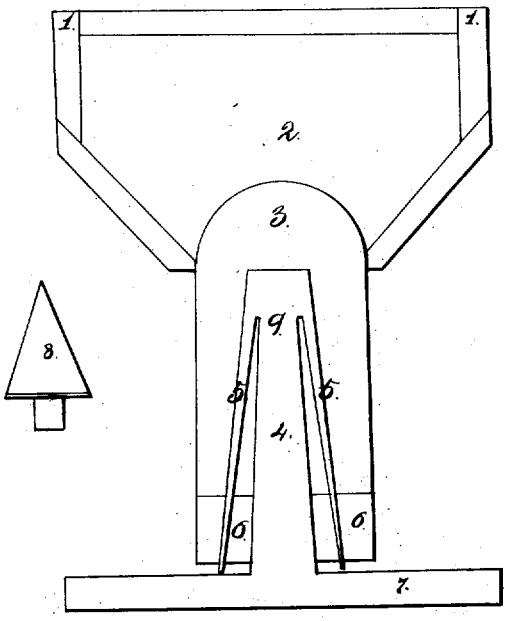
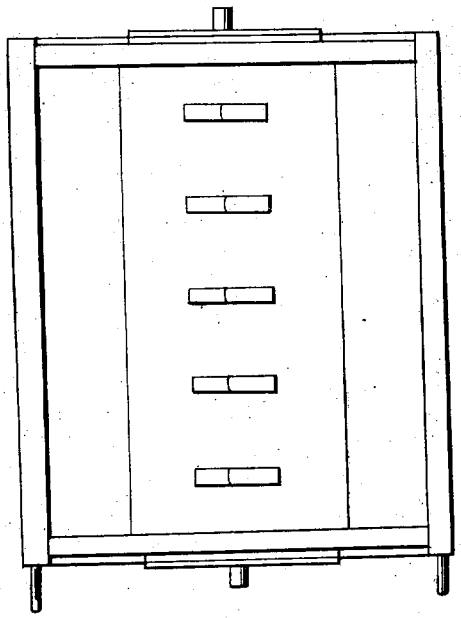
N. PETERS, PHOTO-LITHOGRAPHER, WASHINGTON, D. C Apl. 5. 1831

6444X Miller D. Mulford.
Letters Patent.

The Schedule referred to in these Letters Patent and making part of
the same containing a description in the words of the said Miller D.
Mulford himself of his improvement in the washing Machine.

---

To all to whom these Presents shall come,
Be it known, that I Miller D. Mulford of Blomfield, in the County of
Ontario & State of New York have invented a new & useful machine for wash
ing clothes and that the following is a full and exact description of the opera-
tion and construction of said Machine. The Machine may be made in the
form of a box or cylinder which is hung on gudgeons & placed in a frame & put
in motion by hand, and the motion kept up, by spring and balance power,
which will be more fully shown by the drawings accompanying this
description. Figure 1. where the handles are put to take, hold of to put
the machine in motion, which handles are also necessary to strike the
springs represented by figure 5, which springs help to keep the ma-
chine in motion, together with weights, which are in the box represented
by figure 6, which make the balance power mentioned above, Figure 4, the
standard, on which the box or cylinder is hung on gudgeons, fastened on
each end of the box or cylinder. Figure 7. the sill or bottom of the
frame. Figure 2, represents the end of the box in which the clothes are
put. Figure 8, the shape of the standards, which are fastened inside of
box or cylinder by tenons put thro' the centre of the bottom of the box or
cylinder. Figure 3 the end of the box containing the weights and is fasten
ed to the end of the cylinder or box in which the clothes are. Figure 9.
is where a pin is put through the standard into the board represented
by figure 3. for the purpose of holding the machine in any position for
taking out or putting the clothes into the box or cylinder.

Witness
Jeremiah Stratton
Andrew Hattison

Miller D. Mulford

Exd
MK 964 wB.

in Port Folio.